May 30, 1961 O. MITCHELL 2,986,015
REFRIGERATION SYSTEM CONTROL
Filed Feb. 3, 1958
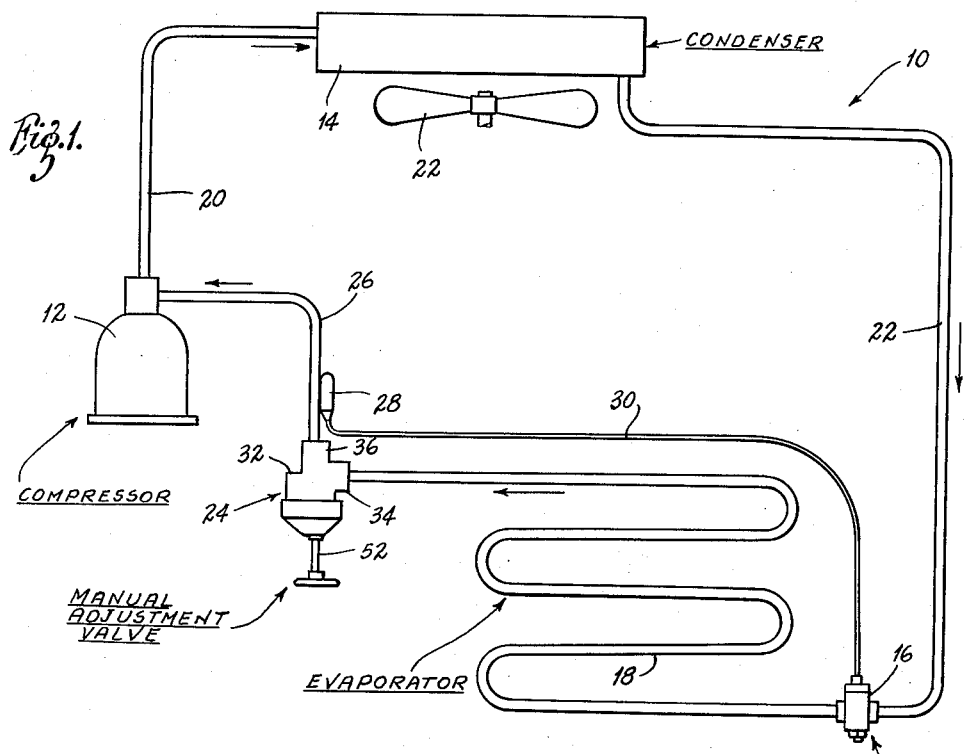
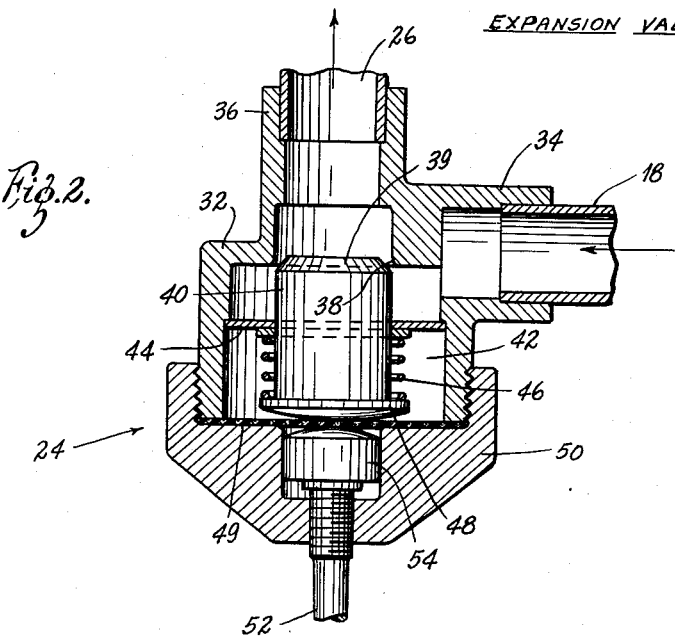
INVENTOR:
ORVILLE MITCHELL,
BY Kingsland, Rogers & Ezell
ATTORNEYS United States Patent Office 2,986,015
Patented May 30, 1961

2,986,015

REFRIGERATION SYSTEM CONTROL

Orville Mitchell, Dallas, Tex., assignor to John E. Mitchell Company, Inc., Dallas, Tex., a corporation of Missouri Filed Feb. 3, 1958, Ser. No. 712,768

12 Claims. (Cl. 62—115)

The present invention relates generally to refrigeration systems, and more particularly to a novel control arrangement in a refrigerating system.

In brief, the invention contemplates the problem of control presented by variations of suction pressure in a simple refrigerating system employing a conventional constant superheat type expansion valve. Where, as in many automobile air conditioners, for example, the compressor is driven from a power source having inherently variable speed, the resulting variations in compressor speed produce corresponding variations in suction pressure and, hence, in the refrigerating effect of the system. In other words, as is well known, an increased suction applied at the evaporator outlet will tend to lower the pressure level in the evaporator so that not only will the refrigerant vaporize at a lower temperature, but the expansion valve will open to permit increased flow of refrigerant. Although the expansion valve may be so controlled as to continue to maintain a substantially constant superheat at the evaporator outlet, the net effect will be an undesired increase in refrigerating effect.

It has now been found, however, that the undesired effects of varying compressor speed over relatively wide limits can be overcome by the incorporation of a device for providing a pressure drop at the evaporator outlet and by locating the temperature sensitive bulb of the expansion valve close to the restriction. Although the bulb preferably is located downstream of the restriction, it may be upstream if close enough to be responsive to temperature change due to expansion through the restriction. Moreover, by making the restriction variable, the refrigerating effect can be controlled at different predetermined levels.

It is an object of the present invention, therefore, to provide a novel control arrangement in a refrigerating system for substantially overcoming variations in refrigerating effect caused by changes in compressor speed.

It is another object of the invention to provide a novel control arrangement in a refrigerating system whereby the net refrigerating effect may be controlled at a predetermined level despite variations in suction pressure.

It is another object of the invention to provide a novel control arrangement in a refrigerating system employing a constant superheat type expansion valve for controlling the net refrigerating effect at different preselected levels despite variations in suction pressure at the compressor.

It is another object of the invention to provide a novel control for a refrigerating system comprising a flow restriction adjacent the evaporator outlet.

It is another object of the present invention to provide a refrigerating system employing a constant superheat type expansion valve wherein a flow restriction is provided at the evaporator outlet and the temperature sensitive element of the expansion valve is located downstream from the flow restriction.

The foregoing, along with other objects and advantages, will be apparent from the following description of a specific embodiment of the invention, as depicted in the accompanying drawing, in which:

Figure 1 is a schematic representation of a refrigerating system incorporating the teachings of the present invention; and Figure 2 is an enlarged cross section of a manual adjustment valve incorporated in the arrangement of Figure 1.

The refrigerating system shown in Figure 1 is designated generally by the numeral 10 and includes a compressor 12, a condenser 14, an expansion valve 16, and an evaporator coil 18, all in generally conventional interconnected arrangement. The system 10 may be employed in various installations, but, in the present instant, is assumed to exist in an installation wherein the compressor 12 is subject to relatively wide variations in speed. In addition, the variations in speed of the compressor are assumed to provide corresponding variations in pressure difference thereacross, including variations in suction pressure at the compressor inlet.

The outlet of the compressor 12 is connected by a line 20 to the condenser 14. The latter may, of course, include a fan 22 designed to effect efficient heat transfer from the refrigerant in the condenser to the cooling air.

A line 22 connects the outlet of the condenser 14 with the high pressure side of the conventional constant superheat expansion valve 16. The low pressure side of the expansion valve 16 is connected directly into the evaporator coil 18. The outlet of the coil 18 is, in turn, connected to a manual adjustment valve 24, and the refrigerant circuit is completed by a line 26 extending from the valve 24 into the inlet of the compressor 12.

Referring once more to the expansion valve 16, a temperature sensitive bulb 28 is connected by a line 30 to the main body of the valve 16. As is well known, the bulb 28 and line 30 contain fluid (not shown) which functions in a constant superheat type of expansion valve to provide a force which tends to open the expansion valve so as to admit an increased flow of liquid refrigerant to the evaporator. It is also well known, of course, that in conventional expansion valves of the type here under discussion the aforesaid force is opposed by the pressure of the refrigerant in the evaporator, either at a point immediately adjacent the expansion valve, or, where an external equalizer is employed, at a point adjacent the outlet of the evaporator. In addition, the aforesaid force tending to open the valve 16 is opposed by a spring force which can be adjusted to control the degree of superheat to be maintained. Attention is directed to the location of the bulb 28 at a point beyond both the outlet of the evaporator 18 and the manual adjustment valve 24. This location of the bulb 28, so as to respond to temperature in the line 26 extending from the valve 24 to the suction side of the compressor 12, has important significance as will appear.

The valve 24, shown in enlarged section in Figure 2, comprises a simple throttling arrangement. Thus, a body 32 having an inlet 34 connected to the evaporator 18 and an outlet 36 connected to the suction line 26 has an internal seat 38 for cooperation with a beveled portion 39 of a movable valve member 40. Preferably, the seat 38 and portion 39 have relatively large diameters compared with the diameter of the flow lines connected with the valve 24, so that relatively small movements of the valve member 40 may effect significant changes in pressure drop through the valve.

The valve 24 has a chamber 42 for accommodation of the member 40, and a guide washer 44 maintains the member 40 in alignment with the heat 38. A spring 46 acts between the guide plate 44 and a head 48 on the member 40 so as to bias the latter toward an open position with respect to the seat 38. The head 40 abuts a flexible diaphragm 49 which seals the chamber 42 against leakage and which is retained in position by a cap member 50 having threaded attachment to the body 32. The cap 50 also accommodates a valve stem 52 in threaded engagement therewith and having a head 54 for bearing engagement with the diaphragm 48 so as to oppose opening movement of the valve member 40. Clearly, the arrangement is such that manipulation of the valve stem 52 is effective to adjust the valve opening as desired without the deleterious effects of backlash.

In use, it has been found that the system 10 operates with a great deal more stability than generally similar arrangements which do not incorporate the above-described throttling valve 24 and place the temperature sensitive bulb 28 downstream therefrom. This stability of operation prevails notwithstanding relatively wide variations in suction pressure in the line 26 resulting from variations in speed of the compressor 12.

With the bulb 28 located on the downstream side of the valve 24, the temperature which affects the operation of the expansion valve 16 may represent a degree of superheat in the suction line 26 which is, of course, different than that desired to be maintained at the outlet of the evaporator 18. The valve 16 can, however, be adjusted by well known means (not shown) to effect a flow of refrigerant which, when the valve 24 is unrestricted, will provide a proper superheat at the evaporator outlet, so that the operation will take place at maximum efficiency.

The stability of the present arrangement when valve 24 is set to a definite restriction, stems from the compensating effect provided by increased cooling by expansion through the valve 24 when the suction pressure is reduced. In other words, assuming a stabilized condition to prevail with the compressor running at constant speed, it is clear that an increase in the speed of the compressor which results in a lowered suction pressure will cause a pressure drop to be felt clear through the evaporator back to the expansion valve 16. This condition tends, as previously noted, to cause the valve 16 to open and to increase the flow of refrigerant. However, the greater part of this pressure drop will occur across the valve 24, so that the tendency for increased flow is correspondingly diminished. At the same time, the expansion through the valve 24 effects a cooling of the bulb 28 which will operate in a well understood manner to provide a closing influence on the valve 16. The net result is a close regulation of the whole system to the end that a substantially constant refrigeration effect is maintained.

When it is desired to increase or decrease the refrigerating effect, the valve 24 may be adjusted so as to increase or decrease the throttling action in a manner which will provide a mean evaporator pressure and corresponding rate of flow commensurate with the desired refrigerating effect.

Although the illustrated system 10 employs an expansion valve 16 which is assumed to have internal equalization, it should be obvious that the arrangement could, if desired, incorporate an expansion valve having conventional external equalization with respect to any point upstream from the valve 24 without altering the inventive concept. It may also be noted that, while the location of the temperature sensitive bulb 28 downstream from the valve 24 is a preferred arrangement, advantage may still be obtained by locating the bulb 28 upstream, as long as it is close enough to the valve 24 to be affected by the temperature changes induced by the valve.

Clearly, there has been provided a refrigeration system control which fulfills the advantages sought therefor.

It is to be understood that the foregoing description and the accompanying drawings have been given by way of illustration and example. It is further to be understood that changes in the form of the elements, rearrangement of the parts, and substitution of equivalent elements, all of which will be apparent to those skilled in the art, are contemplated as being within the scope of the invention, which is limited only by the claims which follow.

What is claimed is:

1. In a closed refrigeration system, a fluid circuit comprising, in series, a compressor, a condenser and an evaporator, a throttling device located between the evaporator and compressor, an expansion valve located between the condenser and evaporator, and mechanism to actuate the expansion valve to reduce the effective refrigeration capacity of the evaporator, including a sensitive element for the expansion valve disposed adjacent the throttling device to be responsive to reduction in temperature resulting from drop in pressure through the said throttling device due to increase in compressor speed.

2. In a closed refrigeration system, a fluid circuit comprising, in series, a compressor, a condenser and an evaporator, a throttling device located between the evaporator and compressor, an expansion valve located between the condenser and evaporator, and mechanism to actuate the expansion valve to increase the effective refrigeration capacity of the evaporator, including a sensitive element for the expansion valve disposed adjacent the downstream side of the throttling device to be responsive to increase in temperature resulting from increase in pressure through said throttling device due to decreasing the compressor speed.

3. In a refrigeration system of the type having a compressor, a condenser, an evaporator, and piping connecting them in that series in closed circuit and a refrigerant fluid therein, the improvement comprising an expansion valve for regulating flow into the evaporator; an expansion device connected into the piping leading from the evaporator; means to adjust the refrigerant flow through the expansion valve including a temperature-responsive sensing device to throttle the rate of flow of refrigerant into the evaporator as temperature at the sensing device decreases, the sensing device being located so as to respond to the temperature conditions produced by expansion of the refrigerant in the expansion device.

4. In a refrigerant system of the compressor-condenser-evaporator-circuit type, wherein the compressor operation is varied to vary the suction on the evaporator regardless of load demands: the combination of an evaporator as aforesaid having an inlet and an outlet; an expansion device in the outlet adapted to produce expansion of the refrigerant and hence pressure-temperature variations in the refrigerant that vary as a function of the suction pressure, namely, becoming lower as suction pressure becomes lower; a valve in the evaporator inlet for regulating the rate of flow of refrigerant into the evaporator, means for positioning the valve to vary the rate of refrigerant flow into the evaporator, including a sensing element located adjacent the downstream side of the expansion device in the outlet so as to receive the variations in the temperature of the refrigerant produced by the expansion of the refrigerant through the expansion device in the outlet, the positioning means and sensing device comprising a temperature-sensitive means to position the valve in the inlet so as to throttle refrigerant flow when the suction pressure in the outlet decreases, so as to counteract at least in part, increase in refrigeration produced in the medium to be cooled as a result of decrease in suction pressure such as that resulting from changes in compressor operation.

5. The system of claim 4 including means to adjust the evaporator oulet expansion device to vary the restrictive effect thereof, and thereby vary the pressure-temperature drop produced thereby on the refrigerant.

6. In combination: a compressor subject to variable operation so as to vary the suction pressure at its inlet, an evaporator having an inlet with connections to receive refrigerant delivered by the compressor under pressure, and having an outlet connected by a suction line to the suction side of the compressor; an expansion device in the suction line to axpand the refrigerant therein and thereby lower the temperature-pressure conditions on the downstream side of the device; a valve regulating the rate of refrigerant flow into the evaporator; means to position the valve to adjust the said rate of flow, the means including a temperature-responsive sensing device located adjacent the expansion device in the suction line to be affected by the temperature reductions in the refrigerant produced by the expansion device, and connections between the sensing device and the valve to cause the valve to throttle in response to reduction in such temperature-pressure conditions.

7. The combination of claim 6 with means responsive to changes in pressure within the evaporator upstream of the expansion device, to urge the valve openward upon rise in pressure.

8. The combination of claim 6 with a combination of substantially constant force means and means responsive to internal evaporator pressure, connected to the valve to urge it openward, so that the valve seeks to maintain a constant superheat produced in the evaporator.

9. A method of regulating the amount of refrigeration produced by a refrigerant-containing evaporator in a compressor-condenser-evaporator type of closed refrigerant circuit, wherein the refrigerant is subject to variations in suction pressure into the compressor unrelated to refrigeration load demand, comprising the steps of: expanding refrigerant into the evaporator; subsequently further expanding refrigerant in a second stage to produce pressure-temperature drops varying as a function of the changes in suction pressure, which drops are substantially greater than the normal pressure drops in the suction line, sensing the temperature drop in the refrigerant produced by its second stage expansion, and regulating the rate of refrigerant flow into the evaporator as functions of the said second stage pressure-temperature drops sensed as aforesaid, so as to reduce flow into the evaporator as the second stage drop increases.

10. A method of regulating the flow of refrigerant into an evaporator in a compressor-condenser-evaporator type of closed refrigerant circuit; comprising the steps of: regulating flow into the evaporator so as to maintain an approximately constant superheat at a point adjacent the evaporator outlet; producing a second stage expansion of refrigerant at the outlet, and employing the cooling effect of the second stage expansion as the control for the rate of flow into the evaporator.

11. The method of claim 10 plus the step of adjusting the degree of expansion at the second stage point, thereby adjusting the amount of refrigeration produced by the system.

12. In a refrigeration system of the compressor-condenser-evaporator type of closed refrigerant circuit; the evaporator as aforesaid having a high pressure inlet and a low pressure outlet; a constant supherheat expansion valve in the inlet, having a temperature-responsive bulb; a flow-constricting device in the evaporator outlet, and the bulb being located adjacent the downstream side of the flow-constricting device to respond to temperature conditions produced by flow through the constricting device.

References Cited in the file of this patent
UNITED STATES PATENTS

| | | |
|---|---|---|
| 2,155,516 | Tull | Apr. 25, 1939 |
| 2,766,593 | Mitchell | Oct. 16, 1956 |

FOREIGN PATENTS

| | | |
|---|---|---|
| 479,640 | Italy | Apr. 7, 1953 |
| 524,433 | Belgium | Dec. 15, 1953 |